US007189580B2

(12) United States Patent
Beebe et al.

(10) Patent No.: US 7,189,580 B2

(45) Date of Patent: Mar. 13, 2007

(54) METHOD OF PUMPING FLUID THROUGH A MICROFLUIDIC DEVICE

(75) Inventors: David J. Beebe, Madison, WI (US); Glenn M. Walker, Brentwood, TN (US)

(73) Assignee: Wisconsin Alumni Research Foundation, Madison, WI (US)

(*) Notice: Subject to any disclaimer, the term of this patent is extended or adjusted under 35 U.S.C. 154(b) by 562 days.

(21) Appl. No.: 10/271,488

(22) Filed: Oct. 16, 2002

(65) Prior Publication Data

US 2003/0132112 A1 Jul. 17, 2003

Related U.S. Application Data

(60) Provisional application No. 60/359,318, filed on Oct. 19, 2001.

(51) Int. Cl.

| | |
|---|---|
| ***G01N 1/10*** | (2006.01) |
| ***G01N 1/00*** | (2006.01) |
| ***B01L 3/02*** | (2006.01) |
| ***B32B 5/02*** | (2006.01) |
| ***B32B 27/04*** | (2006.01) |

(52) U.S. Cl. ....................... 436/180; 422/50; 422/68.1; 422/100; 422/103; 436/43; 436/52; 436/53; 137/8; 137/9; 137/12; 137/14

(58) Field of Classification Search .................. 422/50, 422/100, 68.1, 103; 436/43, 52, 53, 180; 137/8, 9, 12, 14; 417/48

See application file for complete search history.

(56) References Cited

U.S. PATENT DOCUMENTS

| | | | | |
|---|---|---|---|---|
| 6,012,902 | A | 1/2000 | Parce | 417/48 |
| 6,171,067 | B1 | 1/2001 | Parce | 417/48 |
| 6,174,675 | B1 * | 1/2001 | Chow et al. | 435/6 |
| 6,210,128 | B1 * | 4/2001 | Rife et al. | 417/322 |
| 6,224,728 | B1 * | 5/2001 | Oborny et al. | 204/450 |
| 6,262,519 | B1 * | 7/2001 | Furlani et al. | 310/358 |
| 6,296,452 | B1 * | 10/2001 | Caren | 417/53 |
| 6,318,970 | B1 * | 11/2001 | Backhouse | 417/92 |
| 6,368,562 | B1 * | 4/2002 | Yao | 422/100 |
| 6,739,576 | B2 * | 5/2004 | O'Connor et al. | 251/129.14 |
| 6,767,706 | B2 * | 7/2004 | Quake et al. | 435/6 |
| 2003/0203506 | A1 * | 10/2003 | Beebe et al. | 436/180 |

* cited by examiner

*Primary Examiner*—Brian Sines

(74) *Attorney, Agent, or Firm*—Boyle Fredrickson Newholm Stein & Gratz S.C.

(57) ABSTRACT

A method is provided for pumping fluid through a channel of a microfluidic device. The channel has an input port of a predetermined radius and an output port of a predetermined radius. The channel is filled with fluid and a pressure gradient is generated between the fluid between the input port and the fluid at the output port. As a result, fluid flows through the channel towards the output port.

20 Claims, 2 Drawing Sheets

METHOD OF PUMPING FLUID THROUGH A MICROFLUIDIC DEVICE

CROSS-REFERENCE TO RELATED APPLICATIONS

This application claims the benefit of U.S. Provisional Application Ser. No. 60/359,318, filed Oct. 19, 2001.

REFERENCE TO GOVERNMENT GRANT

This invention was made with United States government support awarded by the following agencies: DOD ARPA F30602-00-2-0570. The United States has certain rights in this invention.

FIELD OF THE INVENTION

This invention relates generally to microfluidic devices, and in particular, to a method of pumping fluid through a channel of a microfluidic device.

BACKGROUND AND SUMMARY OF THE INVENTION

As is known, microfluidic devices are being used in an increasing number of applications. However, further expansion of the uses for such microfluidic devices has been limited due to the difficulty and expense of utilization and fabrication. It can be appreciated that an efficient and simple method for producing pressure-based flow within such microfluidic devices is mandatory for making microfluidic devices a ubiquitous commodity.

Several non-traditional pumping methods have been developed for pumping fluid through a channel of a microfluidic device, including some which have displayed promising results. However, the one drawback to almost all pumping methods is the requirement for expensive or complicated external equipment, be it the actual pumping mechanism (e.g., syringe pumps), or the energy to drive the pumping mechanism (e.g., power amplifiers). The ideal device for pumping fluid through a channel of a microfluidic device would be semi-autonomous and would be incorporated totally at the microscale.

The most popular method of moving a fluid through a channel of a microfluidic device is known as electrokinetic flow. Electrokinetic flow is accomplished by conducting electricity through the channel of the microfluidic device in which pumping is desired. While functional in certain applications, electrokinetic flow is not a viable option for moving biological samples through a channel of a microfluidic device. The reason is twofold: first, the electricity in the channels alters the biological molecules, rendering the molecules either dead or useless; and second, the biological molecules tend to coat the channels of the microfluidic device rendering the pumping method useless. Heretofore, the only reliable way to perform biological functions within a microfluidic device is by using pressure-driven flow. Therefore, it is highly desirable to provide a more elegant and efficient method of pumping fluid through a channel of a microfluidic device.

In addition, as biological experiments become more complex, an unavoidable fact necessitated by the now apparent complexity of genome-decoded organisms, is that more complex tools will be required. Presently, in order to simultaneously conduct multiple biological experiments, plates having a large number (e.g. either 96 or 384) of wells are often used. The wells in these plates are nothing more than holes that hold liquid. While functional for their intended purpose, it can be appreciated that these multi-well plates may be used in conjunction with or may even be replaced by microfluidic devices.

To take advantage of existing hardware, "sipper" chips have been developed. Sipper chips are microfluidic devices that are held above a traditional 96 or 384 well plate and sip sample fluid from each well through a capillary tube. While compatible with existing hardware, sipper chips add to the overall complexity, and hence, to the cost of production of the microfluidic devices. Therefore, it would be highly desirable to provide a simple, less expensive alternative to devices and methods heretofore available for pumping fluid through a channel of a microfluidic device.

Therefore, it is a primary object and feature of the present invention to provide a method of pumping fluid through a channel of a microfluidic device, which is simple and inexpensive.

It is a further object and feature of the present invention to provide a method of pumping fluid through a channel of a microfluidic device, which is semi-autonomous and requires only minimal additional hardware.

It is a still further object and feature of the present invention to provide a method of pumping fluid through a channel of a microfluidic device which is compatible with preexisting robotic high throughput equipment.

In accordance with the present invention, a method is provided for pumping a sample fluid through a channel of a microfluidic device. The channel has an input and an output. The method comprises the steps of filling the channel with a channel fluid and depositing a reservoir drop of a reservoir fluid over the output of the channel. The reservoir drop has sufficient dimension to overlap the output of the channel and to exert an output pressure on the channel fluid at the output of the channel. A first pumping drop of the sample fluid is deposited at the input of the channel to exert an input pressure on the channel fluid at the input of the channel that is greater than the output pressure such that the first pumping drop flows into the channel through the input.

A second pumping drop of the sample fluid may be deposited at the input of the channel after the first pumping drop flows into the channel. The input of the channel has a predetermined radius and the first pumping drop has a radius generally equal to the predetermined radius of the input of the channel. The first pumping drop has a user selected volume and projects a height above the microfluidic device when deposited at the input of the channel. The radius of the first pumping drop is calculated according to the expression:

$$R = \left[\frac{3V}{\pi} + h^3\right]\frac{1}{3h^2}$$

wherein: R is the radius of the first pumping drop; V is the user selected volume of the first pumping drop; and h is the height of the first pumping drop above the microfluidic device.

The method of the present invention may include sequentially depositing a plurality of pumping drops at the input of the channel after the first pumping drop flows into the channel. Each of the plurality of pumping drops is deposited at the input of the channel in response to a previously deposited pumping drop flowing into the channel. The volume of the first pumping drop and the plurality of pumping drops are generally equal. It is contemplated that the reservoir fluid and the channel fluid be the same as the sample fluid and that the output pressure exerted by the reservoir drop be generally equal to zero.

In accordance with a still further aspect of the present invention, a method of pumping fluid includes a microfluidic device having a channel therethrough. The channel has an input port of a predetermined radius and an output of a predetermined radius. The channel is filled with fluid and a pressure gradient is generated between the fluid at the input port and the fluid at the output port such that the fluid flows through the channel towards the output port.

The pressure gradient is generated by depositing a reservoir drop of fluid over the output port of the channel of sufficient dimension to overlap the output port and by sequentially depositing pumping drops of fluid at the input port of the channel. Each of the pumping drops has a radius generally equal to the predetermined radius of the input port of the channel. The reservoir drop has a radius greater than the radii of the pumping drops and greater than the predetermined radius of the output port of the channel. The channel through the microfluidic device has a resistance and each of the pumping drops has a radius and a surface free energy. The reservoir drop has a height and a density such that fluid flows through the channel at a rate according to the expression:

$$\frac{dV}{dt} = \frac{1}{Z}\left(\rho g h - \frac{2\gamma}{R}\right)$$

wherein: dV/dt is the rate of fluid flowing through the channel; Z is the resistance of the channel; ρ is the density of the reservoir drop; g is gravity; h is the height of the reservoir drop; γ is the surface free energy of the pumping drops; and R is the radius of the pumping drops.

In accordance with a still further aspect of the present invention, a method of pumping fluid through a channel of a microfluidic device is provided. The channel has an input port of a predetermined radius and an output port of a predetermined radius. The method comprises the steps of filling the channel with fluid and depositing the reservoir drop of fluid over the output of the channel. Pumping drops of the fluid are sequentially deposited at the input port of the channel to generate a pressure gradient between the fluid at the input port and the fluid at the output port whereby the fluid in the channel flows toward the output port.

Each of the pumping drops has a radius generally equal to the predetermined radius of the input port of the channel. The reservoir drop has a radius greater than the predetermined radius of the output port of the channel and has a radius greater than the radii of the pumping drops. The reservoir drop exerts a predetermined pressure on the output port of the channel. It is contemplated that the predetermined pressure exerted by the reservoir drop on the output port is generally equal to zero.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
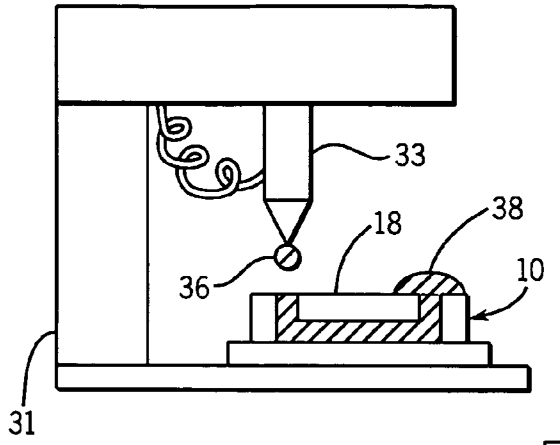
FIG. 1 is a schematic view of a robotic micropipetting station for depositing drops of liquid on the upper surface of a microfluidic device.

Referring to FIGS. 1 and 3–6, a microfluidic device for use in the method of the present invention is generally designated by the reference numeral 10. Microfluidic device 10 may be formed from polydimethylsiloxane (PDMS), for reasons hereinafter described, and has first and second ends 12 and 14, respectively, and upper and lower surfaces 18 and 20, respectively. Channel 22 extends through microfluidic device 10 and includes a first vertical portion 26 terminating at an input port 28 that communicates with upper surface 18 of microfluidic device 10 and a second vertical portion 30 terminating at an output port 32 also communicating with upper surface 18 of microfluidic device 10. First and second vertical portions 26 and 30, respectively, of channel 22 are interconnected by and communicate with horizontal portion 34 of channel 22. The dimension of channel 22 connecting input port 28 and output port 32 are arbitrary.

Figure 2:
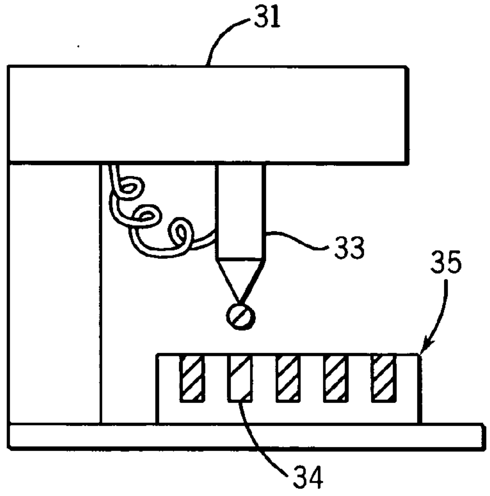
FIG. 2 is a schematic view of the robotic micropipetting station of FIG. 1 depositing drops of liquid in a well of a multi-well plate.
Figure 3:
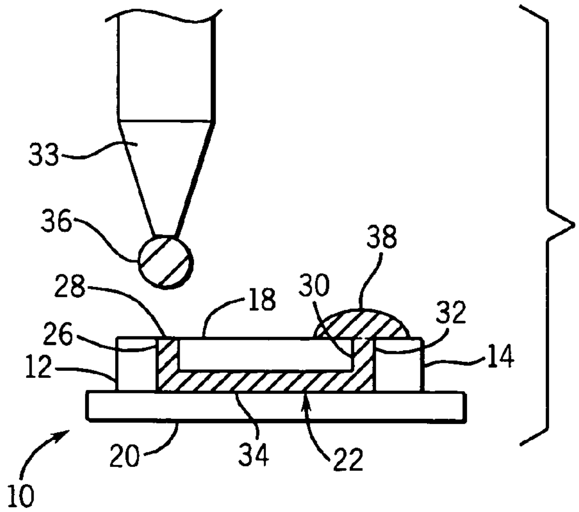
FIG. 3 is an enlarged, schematic view of the robotic micropipetting station of FIG. 1 showing the depositing of a drop of liquid on the upper surface of a microfluidic device by a micropipette.
Figure 4:
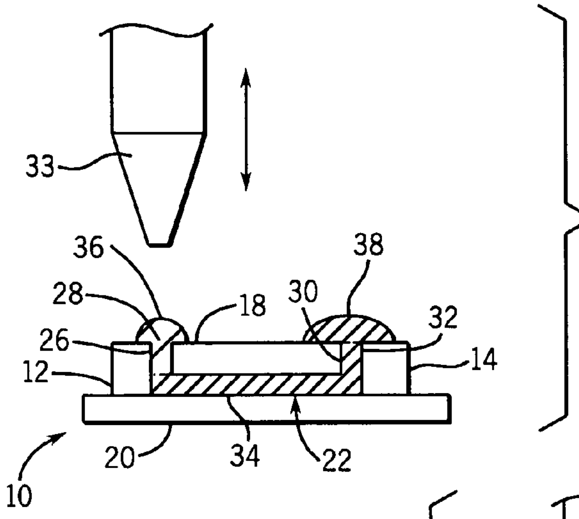
FIG. 4 is a schematic view, similar to FIG. 3, showing the drop of liquid deposited on the upper surface of the microfluidic device by the micropipette.
Figure 5:
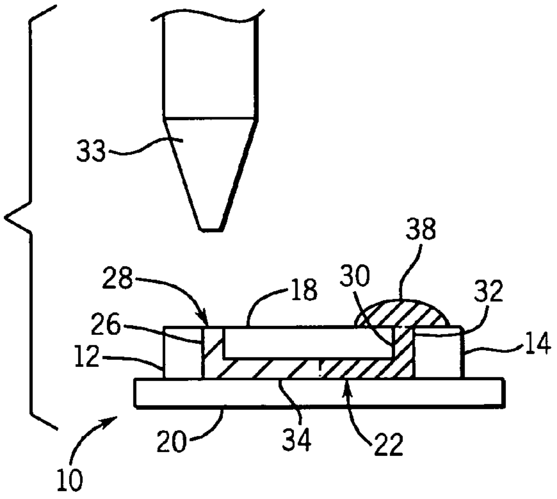
FIG. 5 is a schematic view, similar to FIGS. 3 and 4, showing the drop of liquid flowing into a channel of the microfluidic device by the micropipette.
Figure 6:
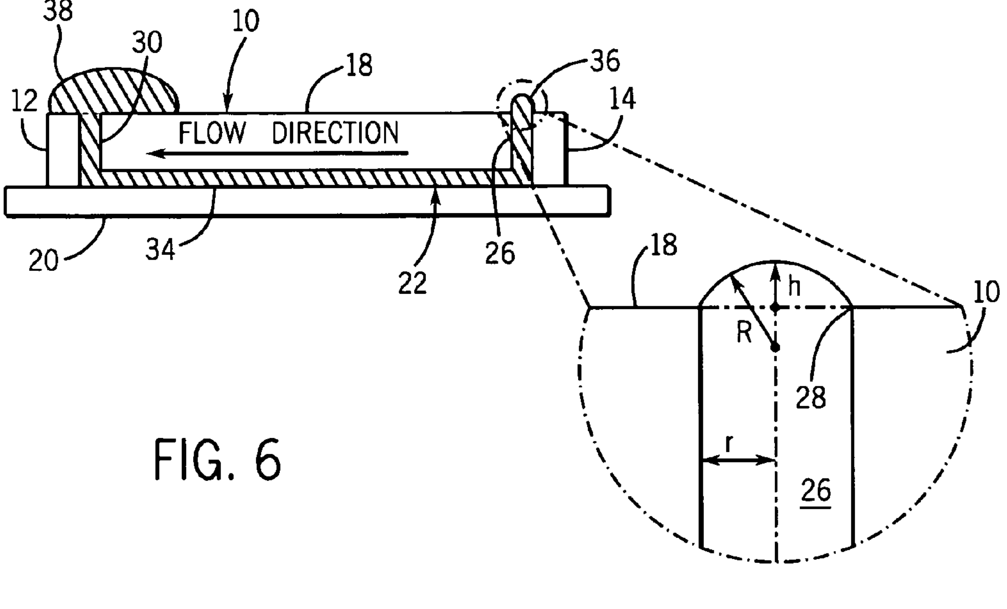
FIG. 6 is an enlarged, schematic view showing the dimensions of the drop of liquid deposited on the upper surface of the microfluidic device by the micropipette.

A robotic micropipetting station 31 is provided and includes micropipette 33 for depositing drops of liquid, such as pumping drop 36 and reservoir drop 38, on upper surface 18 of microfluidic device 10, for reasons hereinafter described. Modern high-throughput systems, such as robotic micropipetting station 31, are robotic systems designed solely to position a tray (i.e. multiwell plate 35, FIG. 2, or microfluidic device 10, FIG. 1) and to dispense or withdraw microliter drops into or out of that tray at user desired locations (i.e. well 34 of multiwell plate 35 or the input and output ports 28 and 32, respectively, of channel 22 of microfluidic device 10) with a high degree of speed, precision, and repeatability.

The amount of pressure present within a pumping drop 36 of liquid at an air-liquid interface is given by the Young-LaPlace equation:

$$\Delta P = \gamma(1/R1 + 1/R2) \qquad \text{Equation (1)}$$

wherein γ is the surface free energy of the liquid; and R1 and R2 are the radii of curvature for two axes normal to each other that describe the curvature of the surface of pumping drop 36.

For spherical drops, Equation (1) may be rewritten as:

$$\Delta P = 2\gamma/R \qquad \text{Equation (2)}$$

wherein: R is the radius of the spherical pumping drop 36, FIG. 6.

From Equation (2), it can be seen that smaller drops have a higher internal pressure than larger drops. Therefore, if two drops of different size are connected via a fluid-filled tube (i.e. channel 22), the smaller drop will shrink while the larger one grows in size. One manifestation of this effect is the pulmonary phenomenon called "instability of the alveoli" which is a condition in which large alveoli continue to grow while smaller ones shrink. In view of the foregoing, it can be appreciated that fluid can be pumped through channel 22 by using the surface tension in pumping drop 36, as well as, input port 28 and output port 32 of channel 22.

In accordance with the pumping method of the present invention, fluid is provided in channel 22 of microfluidic device 10. Thereafter, a large reservoir drop 38 (e.g., 100 μL), is deposited by micropipette 33 over output port 32 of channel 22, FIG. 3. The radius of reservoir drop 38 is greater than the radius of output port 32 and is of sufficient dimension that the pressure at output port 32 of channel 22 is essentially zero. A pumping drop 36, of significantly smaller dimension than reservoir drop 38, (e.g., 0.5–5 μL), is deposited on input port 28 of channel 22, FIGS. 4 and 6, by micropipette 33 of robotic micropipetting station 31, FIG. 1. Pumping drop 36 may be hemispherical in shape or may be other shapes. As such, it is contemplated that the shape and the volume of pumping drop 36 be defined by the hydrophobic/hydrophilic patterning of the surface surrounding input port 28 in order to extend the pumping time of the method of the present invention. As heretofore described, microfluidic device 10 is formed from PDMS which has a high hydrophobicity and has a tendency to maintain the hemispherical shapes of pumping drop 36 and reservoir drop 38 on input and output ports 28 and 32, respectively. It is contemplated as being within the scope of the present invention that the fluid in channel 22, pumping drops 36 and reservoir drop 38 be the same liquid or different liquids.

Because pumping drop 36 has a smaller radius than reservoir drop 38, a larger pressure exists on the input port 28 of channel 22. The resulting pressure gradient causes the pumping drop 36 to flow from input port 28 through channel 22 towards reservoir drop 38 over output port 32 of channel 22, FIG. 5. It can be understood that by sequentially depositing additional pumping drops 36 on input port 28 of channel 22 by micropipette 33 of robotic micropipetting station 31, the resulting pressure gradient will cause the pumping drops 36 deposited on input port 28 to flow through channel 22 towards reservoir drop 38 over output port 32 of channel 22. As a result, fluid flows through channel 22 from input port 28 to output port 32.

Referring back to FIG. 6, the highest pressure attainable for a given radius, R, of input port 28 of channel 22 is a hemispherical drop whose radius is equal to the radius, r, of input port 28 of channel 22. Any deviation from this size, either larger or smaller, results in a lower pressure. As such, it is preferred that the radius of each pumping drop 36 be generally equal to the radius of input port 28. The radius (i.e., the radius which determines the pressure) of pumping drop 36 can be determined by first solving for the height, h, that pumping drop 36 rises above a corresponding port, i.e. input port 28 of channel 22. The pumping drop 36 radius can be calculated according to the expression:

$$R = \left[\frac{3V}{\pi} + h^3\right]\frac{1}{3h^2} \quad \text{Equation (3)}$$

wherein: R is the radius of pumping drop 36; V is the user selected volume of the first pumping drop; and h is the height of pumping drop 36 above upper surface 18 of microfluidic device 10.

The height of pumping drop 36 of volume V can be found if the radius of the spherical cap is also known. In the present application, radius of the input port 28 is the spherical cap radius. As such, the height of pumping drop 36 may be calculated according to the expression:

$$h = \frac{1}{6}\left[108b + 12(12a^3 + 81b^2)^{\frac{1}{2}}\right]^{\frac{1}{3}} - \frac{2a}{\left[108b + 12(12a^3 + 81b^2)^{\frac{1}{2}}\right]^{\frac{1}{3}}} \quad \text{Equation (4)}$$

wherein: $a=3r^2$ (r is the radius of input port 28); and $b=6V/\pi$ (V is the volume of pumping drop 36 placed on input port 28).

The volumetric flow rate of the fluid flowing from input port 28 of channel 22 to output port 32 of channel 22 will change with respect to the volume of pumping drop 36. Therefore, the volumetric flow rate or change in volume with respect to time can be calculated using the equation:

$$\frac{dV}{dt} = \frac{1}{Z}\left(\rho g h - \frac{2\gamma}{R}\right) \quad \text{Equation (5)}$$

wherein: dV/dt is the rate of fluid flowing through channel 22; Z is the flow resistance of channel 22; ρ is the density of pumping drop 36; g is gravity; h is the height of reservoir drop 38; γ is the surface free energy of pumping drop 36; and R is the radius of the pumping drops 36.

It is contemplated that various applications of the method of the present invention are possible without deviating from the present invention. By way of example, multiple input ports could be formed along the length of channel 22. By designating one of such ports as the output port, different flow rates could be achieved by depositing pumping drops on different input ports along length of channel 22 (due to the difference in channel resistance). In addition, temporary output ports 32 may be used to cause fluid to flow into them, mix, and then, in turn, be pumped to other output ports 32. It can be appreciated that the pumping method of the present invention works with various types of fluids including water and biological fluids. As such fluid media containing cells and fetal bovine serum may be used to repeatedly flow cells down channel 22 without harming them.

Further, it is contemplated to etch patterns in upper surface 18 of microfluidic device 10 about the outer peripheries of input port 28 and/or output port 32, respectively, in order to alter the corresponding configurations of pumping drop 36 and reservoir drop 38 deposited thereon. By altering the configurations of pumping and reservoir drops 36 and 38, respectively, it can be appreciated that the volumetric flow rate of fluid through channel 22 of microfluidic device 10 may be modified. In addition, by etching the patterns in upper surface 18 of microfludic device 10, it can be appreciated that the time period during which the pumping of the fluid through channel 22 of microfluidic device 10 takes place may be increased or decreased to a user desired time period.

As described, there are several benefits to use of the pumping method of the present invention. By way of example, the pumping method of the present invention allows high-throughput robotic assaying systems to directly interface with microfluidic device 10 and pump liquid using only micropipette 33. In a lab setting manual pipettes can also be used, eliminating the need for expensive pumping equipment. Because the method of the present invention relies on surface tension effects, it is robust enough to allow fluid to be pumped in microfluidic device 10 in environments where physical or electrical noise is present. The pumping rates are determined by the volume of pumping drop 36 present on input port 28 of the channel 22, which is controllable to a high degree of precision with modern robotic micropipetting stations 31. The combination of these factors allows for a pumping method suitable for use in a variety of situations and applications.

Various modes of carrying out the invention are contemplated as being within the scope of the following claims particularly pointing out and distinctly claiming the subject matter, which is regarded as the invention.

We claim:

1. A method of pumping sample fluid through a channel of a microfluidic device, the channel having an input and an output, comprising the steps of:

filling the channel with a channel fluid;

depositing a reservoir drop of a reservoir fluid over the output of the channel of sufficient dimension to overlap the output of the channel and to exert an output pressure on the channel fluid at the output of the channel; and depositing a first pumping drop of the sample fluid at the input of the channel to exert an input pressure on the channel fluid at the input of the channel that is greater than the output pressure such that the first pumping drop flows into the channel through the input.

2. The method of claim 1 comprising the additional step of depositing a second pumping drop of the sample fluid at the input of the channel after the first pumping drop flows into the channel.

3. The method of claim 1 wherein the input of the channel has a predetermined radius and wherein the first pumping drop has a radius generally equal to the predetermined radius of the input of the channel.

4. The method of claim 3 wherein the first pumping drop has a user selected volume and projects a height above the microfluidic device when deposited at the input of the channel and wherein the radius of the first pumping drop is calculated according to the expression:

$$\frac{dV}{dt} = \frac{1}{Z}\left(\rho gh - \frac{2\gamma}{R}\right)$$

wherein: R is the radius of the first pumping drop; V is the user selected volume of the first pumping drop; and h is the height of the first pumping drop above the microfluidic device.

5. The method of claim 1 wherein the output pressure of the reservoir drop on the channel fluid at the output of the channel is generally equal to zero.

6. The method of claim 1 comprising the additional step of sequentially depositing a plurality of pumping drops at the input of the channel after the first pumping drop flows into the channel.

7. The method of claim 6 wherein each of the plurality of pumping drops is sequentially deposited at the input of the channel as the previously deposited pumping drop flows into the channel.

8. The method of claim 6 wherein the first pumping drop has a volume and wherein the plurality of pumping drops have volumes generally equal to the volume of the first pumping drop.

9. The method of claim 1 wherein the reservoir fluid and the channel fluid are the sample fluid.

10. A method of pumping fluid, comprising the steps of:

providing a microfluidic device having a channel therethough, the channel having an input port of a predetermined radius and an output port of a predetermined radius;

filing the channel with fluid; and generating a pressure gradient between the fluid at the input port and the fluid at the output port such that the fluid flows through the channel towards the output port, the step of generating the pressure gradient including the additional steps of:

depositing a reservoir drop of fluid over the output port of the channel of sufficient dimension to overlap the output port; and sequentially depositing pumping drops of fluid at the input port of the channel.

11. The method of claim 10 wherein each of the pumping drops has a radius generally equally to the predetermined radius of the input port of the channel.

12. The method of claim 11 wherein the reservoir drop has a radius greater than the radii of the pumping drops.

13. The method of claim 10 wherein the reservoir drop has a radius greater than the predetermined radius of the output port of the channel.

14. The method of claim 10 wherein:

the channel has a resistance;

each of the pumping drops has a radius and a surface free energy; and the reservoir drop has a height and a density such that the fluid flows through the channel at a rate according to the expression:

$$\frac{dV}{dt} = \frac{1}{Z}\left(\rho gh - \frac{2\gamma}{R}\right)$$

wherein: dV/dt is the rate of fluid flowing through the channel; Z is the resistance of the channel; ρ is the density of the reservoir drop; g is gravity; h is the height of the reservoir drop; γ is the surface free energy of the pumping drops; and R is the radius of the pumping drops.

15. A method of pumping fluid through a channel of a microfluidic device, the channel having an input port of a predetermined radius and an output port of a predetermined radius, comprising the steps of:

filling the channel with fluid; and depositing a reservoir drop of fluid over the output port of the channel and sequentially depositing pumping drops of fluid at the input port of the channel to generate a pressure gradient between fluid at the input port and fluid at the output port;

whereby the fluid in the channel flows toward the output port.

16. The method of claim 15 wherein the reservoir drop has a radius greater than the predetermined radius of the output port of the channel.

17. The method of claim 15 wherein each of the pumping drops has a radius generally equally to the predetermined radius of the input port of the channel.

18. The method of claim 17 wherein the reservoir drop has a radius greater than the radii of the pumping drops.

19. The method of claim 15 wherein the reservoir drop exerts a predetermined pressure on the output port of the channel.

20. The method of claim 19 wherein the predetermined pressure exerted by the reservoir drop on the output port is generally equal to zero.

* * * * *